Patented Dec. 5, 1922.

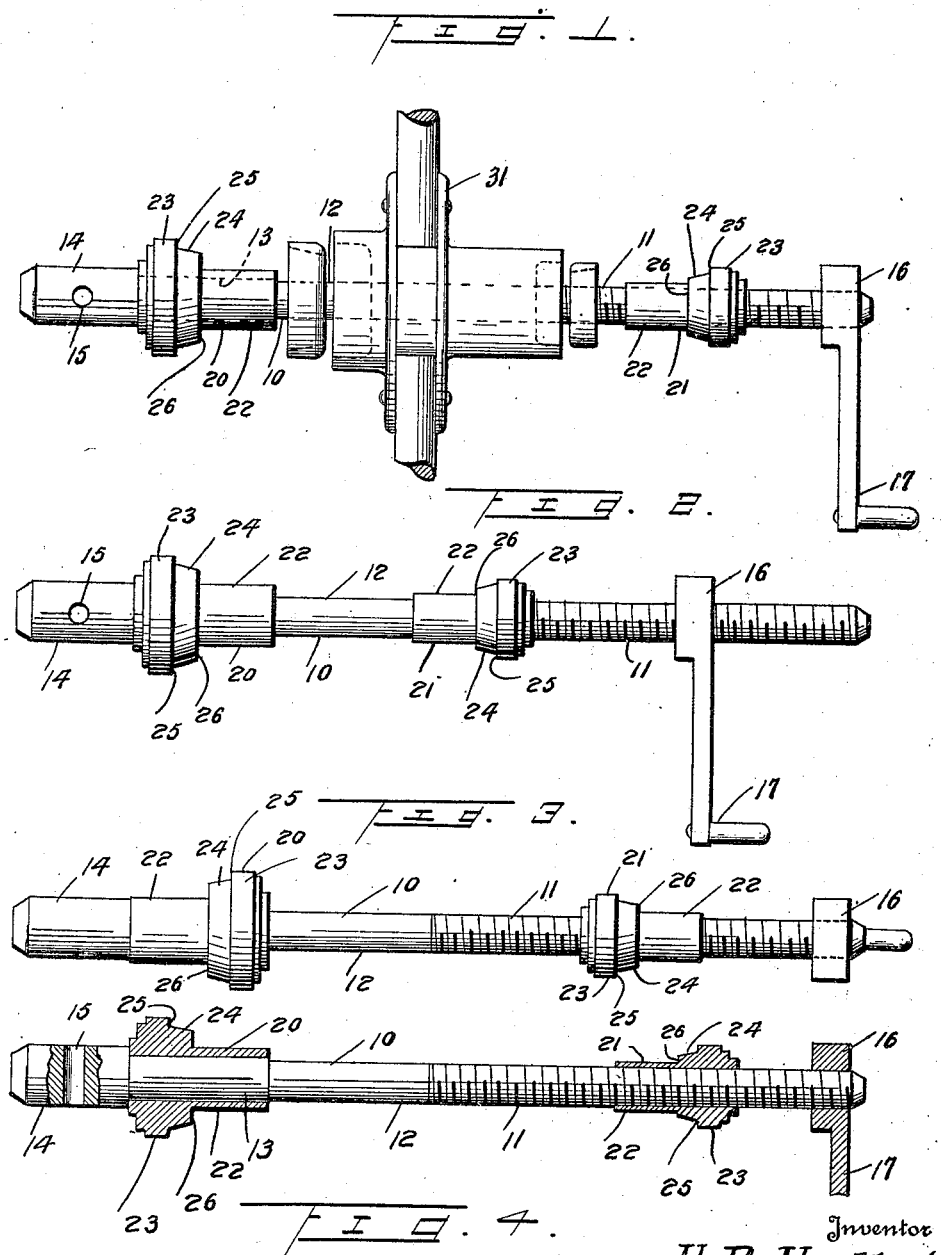

1,438,039

UNITED STATES PATENT OFFICE.

HARDEN R. HURLBUT, OF WHEATON, MISSOURI.

TOOL FOR INSERTING RACEWAYS IN HUBS AND HOUSINGS.

Application filed January 4, 1921. Serial No. 434,923.

*To all whom it may concern:*

Be it known that I, HARDEN R. HURLBUT, a citizen of the United States, residing at Wheaton, in the county of Barry and State of Missouri, have invented certain new and useful Improvements in Tools for Inserting Raceways in Hubs and Housings; and I do hereby declare the following to be a full, clear, and exact description of the invention, such as will enable others skilled in the art to which it appertains to make and use the same.

This invention relates to a tool for inserting raceways in wheels, hubs, and in housings such as transmission cases, rear axle constructions of pleasure cars, trucks and tractors, and the like, and more particularly to a tool designed for inserting the raceways in tapered roller bearings, and the raceways of ball bearings of the cup and cone type.

The primary object is to provide means for inserting these raceways in exact position with reference to the main axis of the hub or housing, thereby avoiding the uneven wear which results from insertion in a slightly incorrect position,—that is out of alinement,—owing to the common practice of applying these raceways with a hammer and punch.

A further object is to provide, in a single tool, means for inserting the elements of either a roller bearing or a ball bearing, of the types specified.

A still further object is to provide a device which shall include a spindle or screw shaft, a pair of heads fitting the shaft snugly, but movable longitudinally thereof and a crank nut by means of which the heads are caused to force the raceways into the hub or housing.

A still further object is to provide a plurality of heads serving the purpose indicated and specially formed to permit of use when inserting the raceways of either roller bearings or ball bearings.

With the foregoing and other objects in view, the invention consists in the novel construction, combination, and arrangement of elements hereinafter described and claimed, it being understood that minor changes may be made within the scope of the claims, without departing from the spirit of the invention.

In the accompanying drawing:

Figure 1 is a view illustrating the manner in which the device is used in inserting raceways in hubs.

Figure 2 is a view in side elevation of the device arranged for inserting the raceways of roller bearings.

Figure 3 is a view in side elevation of the device arranged for inserting the raceways of ball bearings, and Figure 4 is a sectional view taken on a plane extending centrally and longitudinally through the device.

In carrying out my invention, I provide a spindle or screw shaft, designated 10 and including a threaded portion 11, a smoothed portion 12 and a similar portion 13 of slightly greater diameter. The extreme end 14 opposite to the threaded end is of a suitable diameter to provide the required strength and is provided with a transverse bore 15 through which a tool such as a punch may be inserted, to prevent the turning of the spindle when the device is in operation, or when the raceways are being applied to the hub or housing. The threaded portion of the spindle designated 11 is engaged by a nut 16 having formed therewith a crank 17, whereby the necessary pressure is applied to the heads referred to below, in forcing the raceways into position.

The heads are designated 20 and 21, and each includes a cylinder portion 22 which passes into the bore of the hub or housing, and a cylindrical portion 23 of greater diameter. A tapered portion 24 and shoulders 25 and 26 complete that portion of the head, that is, of each head, designed for use when inserting a raceway of a roller bearing of the type indicated. Each head is provided with a central longitudinal bore fitting the spindle snugly but permitting longitudinal movement hereinbefore indicated. The heads are maintained in exact alinement due to the accuracy of the fit between the heads and the spindle and between the outer portions of the heads and the wall of the bore in the hub or housing.

In the accompanying drawing the tool is shown in position for inserting raceways in the hub of a wheel. The manner in which the tool is used in inserting raceways in housings will be apparent to those skilled in art to which the tool relates. The hub is designated at 31 and the spindle is shown as extending longitudinally with reference to the bore thereof.

When applying the raceways of a roller bearing, the heads are in the relative position shown in Figure 2, and when applying the raceways of a ball bearing, they are then in the relative position shown in Figure 3, the screw shaft being threaded a sufficient distance to permit of either position. The crank nut is turned to force the heads toward each other, and thereby force the cups or raceways into position in the hub or housing, all elements maintaining exact alinement during the operation, as distinguished from the angular movement necessarily involved in inserting the raceways by the use of a hammer and punch.

Having thus described my invention what I claim is:

1. A device of the class described having a spindle, reversible heads on said spindle, said heads being of different shape at each end, an abutment on the spindle for one of said heads, and means operable on the spindle against the other head to urge movement of one head toward the other head.

2. A device of the class described having a spindle, heads on said spindle one slidable relatively to the other, and said heads being of different shape at each end and reversible for the purpose specified.

In testimony whereof I affix my signature in presence of two witnesses.

HARDEN R. HURLBUT.

Witnesses:
J. H. BROWN.
FRED. E. GUNDEL.